(12) United States Patent
Tian

(10) Patent No.: US 11,437,673 B2
(45) Date of Patent: Sep. 6, 2022

(54) BATTERY AND DEVICE USING THE SAME

(71) Applicant: Ningde Amperex Technology Ltd., Ningde (CN)

(72) Inventor: Jiao Tian, Ningde (CN)

(73) Assignee: NINGDE AMPEREX TECHNOLOGY LTD, Fujian (CN)

( * ) Notice: Subject to any disclaimer, the term of this patent is extended or adjusted under 35 U.S.C. 154(b) by 122 days.

(21) Appl. No.: 16/524,404

(22) Filed: Jul. 29, 2019

(65) Prior Publication Data

US 2020/0303691 A1 Sep. 24, 2020

(30) Foreign Application Priority Data

Mar. 22, 2019 (CN) .......................... 201910224250.6

(51) Int. Cl.
*H01M 50/116* (2021.01)
*H01M 50/172* (2021.01)
*H01M 50/531* (2021.01)

(52) U.S. Cl.
CPC ....... *H01M 50/172* (2021.01); *H01M 50/116* (2021.01); *H01M 50/531* (2021.01)

(58) Field of Classification Search
CPC . H01M 50/116; H01M 50/172; H01M 50/531
See application file for complete search history.

(56) References Cited

U.S. PATENT DOCUMENTS

| 2001/0038938 A1 | 11/2001 | Takahashi et al. |
| 2009/0035654 A1* | 2/2009 | Kodama ............. H01M 50/531 |
| | | 429/179 |
| 2013/0078507 A1 | 3/2013 | Mizuta et al. |

FOREIGN PATENT DOCUMENTS

| CN | 203733900 U | 7/2014 |
| CN | 104332646 A | 2/2015 |
| CN | 201510686262 | 1/2016 |
| EP | 2006935 A1 | 12/2008 |
| WO | 2016/204088 A1 | 12/2016 |

* cited by examiner

*Primary Examiner* — Osei K Amponsah
(74) *Attorney, Agent, or Firm* — Morgan, Lewis & Bockius LLP

(57) ABSTRACT

An impact-proofed battery includes a packaging film, an electrode assembly received in the packaging film, tabs extending from an end portion of the electrode assembly, and insulating layers. Each tab includes a connecting region, a packaging region, and an exposed region connected in the order written. The connecting region is electrically connected to the electrode assembly, and the exposed region is exposed from the packaging film. Each insulating layer includes a packaging portion and a protective portion connecting to the packaging portion. The packaging portion covers the packaging region and is between the packaging film and the packaging region. The protective portion is between the connecting region and the packaging film, and an area of the protective portion is greater than an area of the connecting region. The disclosure also provides a device using the battery.

20 Claims, 14 Drawing Sheets

BATTERY AND DEVICE USING THE SAME

FIELD

The subject matter herein generally relates to batteries, in particular, to a battery and a device using the battery.

BACKGROUND

Safety of electronic products is important. Specifically, the impact-proof of electronic products is one of safety factors of concern. As an integral part of the electronic products, batteries must have the same qualities. When the electronic product is dropped, the battery may be easily pierced by the tab in the packaging film of the battery, the top of the packaging film may also be easily broken by an impact to the electronic product.

What is needed, is a battery with improved safety features and reliability.

SUMMARY

A battery includes a packaging film, an electrode assembly received in the packaging film, tabs extending from an end portion of the electrode assembly, and insulating layers. Each of the tabs includes a connecting region, a packaging region, and an exposed region connected in the order written. The connecting region is electrically connected to the electrode assembly, and the exposed region is exposed from the packaging film. Each of the insulating layers includes a packaging portion and a protective portion connecting to the packaging portion. The packaging portion covers the packaging region and is located between the packaging film and the packaging region. The protective portion is located between the connecting region and the packaging film, and an area of the protective portion is greater than an area of the connecting region.

Further, the protective portion is located on an outer surface of the connecting region.

Further, the connecting region includes a plurality of sub-tabs and each of the insulating layers includes a plurality of the protective portions. Each sub-tab is covered by one protective portion, and the protective portions are independent of each other or integrally connected to each other.

Further, the tabs include at least one positive tab and at least one negative tab. The packaging region of each positive tab and the packaging region of each negative tab are covered by the packaging portions. The packaging portion covering each positive tab and the packaging portion covering each negative tab are independent of each other or can be integrally connected to each other. The protective portion corresponding to each positive tab and the protective portion corresponding to each negative tab are independent of each other or can be integrally connected to each other.

Further, each of the insulating layers further includes an adhesive portion, the adhesive portion bonds the connecting region with the protective portion.

Further, an end of the protective portion facing away from the packaging portion is located on an outer surface of the electrode assembly.

Further, each of the insulating layers further includes an adhesive portion, the adhesive portion bonds the protective portion with the electrode assembly.

Further, each of the insulating layers further includes an adhesive portion, the adhesive portion bonds the protective portion with the packaging film.

Further, the protective portion is located on an outer surface of the connecting region.

Further, a thickness of the packaging portion is about 5 μm to about 200 μm, and a thickness of the protective portion is about 5 μm to about 200 μm.

A device includes the battery. The battery includes a packaging film, an electrode assembly received in the packaging film, tabs extending from an end portion of the electrode assembly, and insulating layers. Each of the tabs includes a connecting region, a packaging region, and an exposed region connected in the order written. The connecting region is electrically connected to the electrode assembly, and the exposed region is exposed from the packaging film. Each of the insulating layers includes a packaging portion and a protective portion connecting to the packaging portion. The packaging portion covers the packaging region and is located between the packaging film and the packaging region. The protective portion is located between the connecting region and the packaging film, and an area of the protective portion is greater than an area of the connecting region.

In the battery of the present disclosure, the protective portion is located between the connecting region and the packaging film, and an area of the protective portion is greater than an area of the connecting region. Direct contact between the connecting region and the packaging region is thus prevented, piercing of the packaging film when the connecting region and the packaging region are subjected to jarring or impact does not occur. The safety and reliability of the battery disclosed are improved.

BRIEF DESCRIPTION OF THE DRAWINGS

Implementations of the present disclosure will now be described, by way of embodiments, with reference to the attached figures.

DETAILED DESCRIPTION

Figure 1:
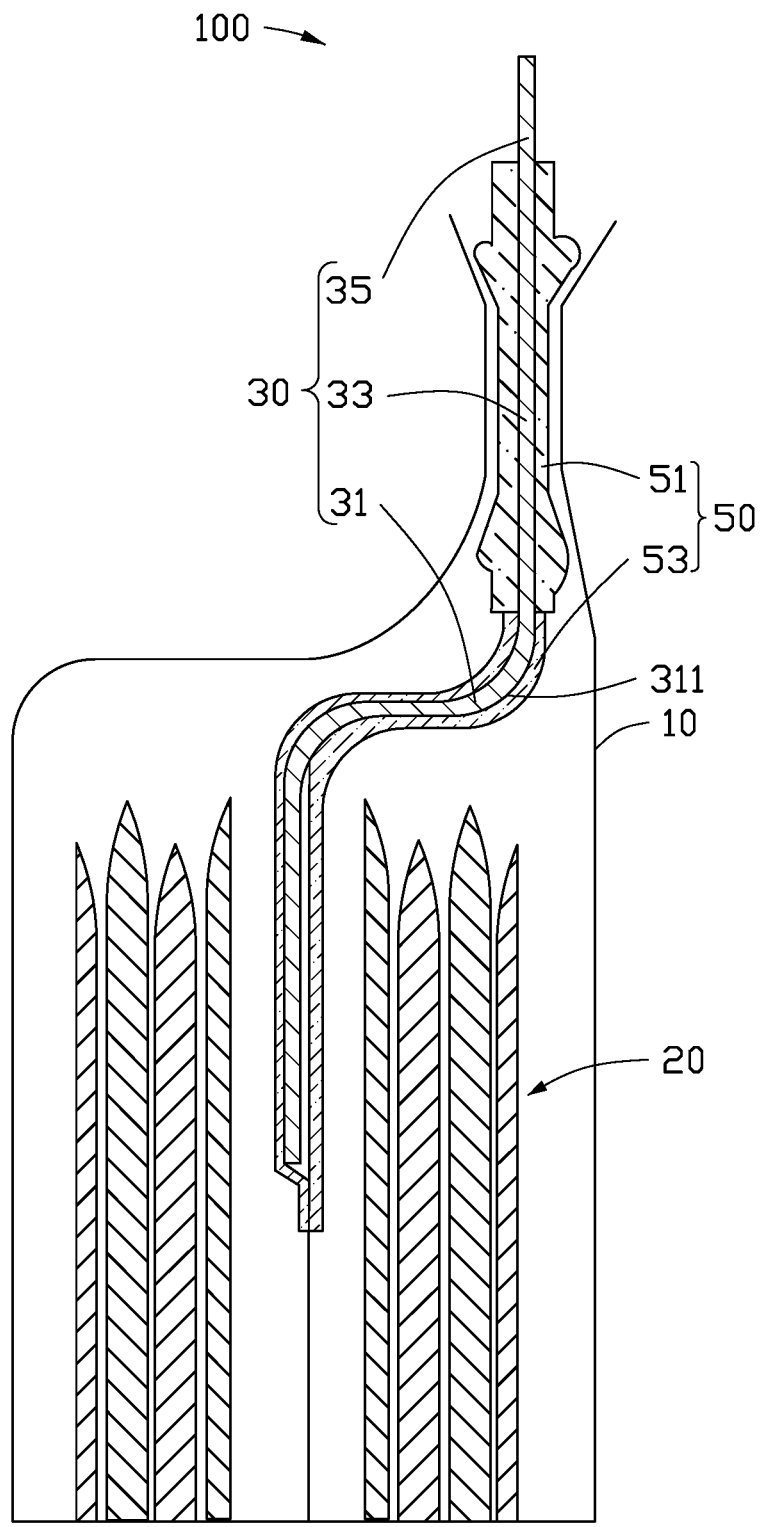
FIG. 1 is a cross-sectional view of a first embodiment of part of a battery.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates an embodiment of a battery 100. The battery 100 includes a packaging film 10, an electrode assembly 20, tabs 30, and insulating layers 50. The electrode assembly 20 is received in the packaging film 10. Each tab 30 extends from an end portion of the electrode assembly 20.

Each tab 30 includes a connecting region 31, a packaging region 33, and an exposed region 35 connected in the order written. The connecting region 31 is electrically connected to the electrode assembly 20. The exposed region 35 is exposed from the packaging film 10.

Each insulating layer 50 includes a packaging portion 51 and a protective portion 53 connecting to the packaging portion 51. The packaging portion 51 covers the packaging region 33 and is located between the packaging film 10 and the packaging region 33. The protective portion 53 is located between the connecting region 31 and the packaging film 10, and an area of the protective portion 53 is greater than an area of the connecting region 31. Direct contact between the connecting region 31 and the packaging region 33 is thus prevented, and the packaging film 10 is protected from being pierced when jarred or impacted. An area of a structure of the present disclosure is a superficial area of the largest surface of the structure. In the illustrated embodiment, the area of the protective portion 53 is an area of a surface of the protective portion 53 in contact with the connecting region 31, and the area of the connecting region 31 is an area of a surface of the connecting region 31 in contact with the protective portion 53.

In a first embodiment, referring to FIG. 1, the protective portion 53 is located on an outer surface 311 of the connecting region 31. Any burrs or projections from the connecting region 31 thus cannot pierce the packaging film 10, and the connecting region 31 and the electrode assembly 20 will not be short circuited by any contact. The protective portion 53 also acts as a buffer between the electrode assembly 20 and a top of the packaging film 10 when the battery 100 suffers impact or jarring. Safety and reliability of the battery 100 are thus further improved.

Figure 2:
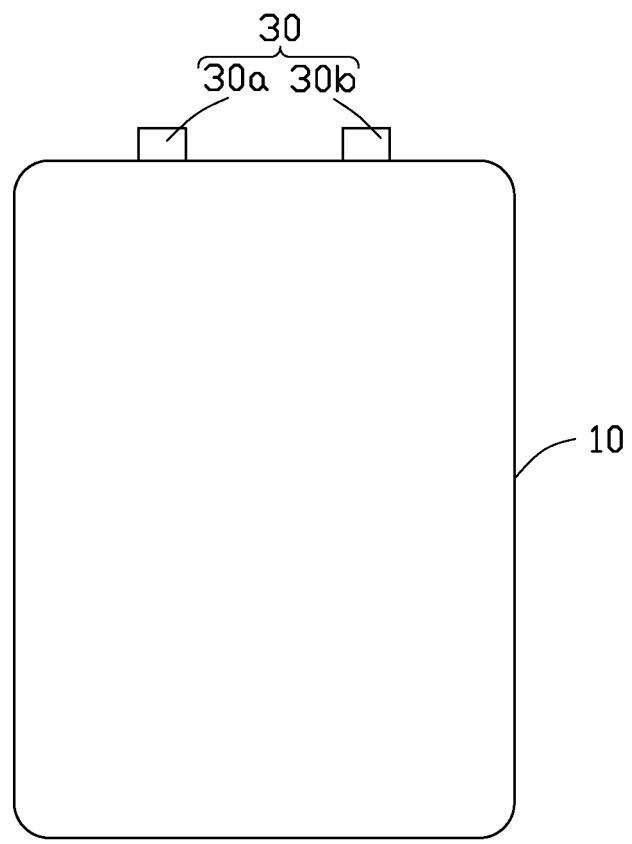
FIG. 2 is a diagram of an embodiment of a battery.

In at least one embodiment, referring to FIG. 2, the number of the tabs 30 is two, being a positive tab 30a and a negative tab 30b.

Figure 3:
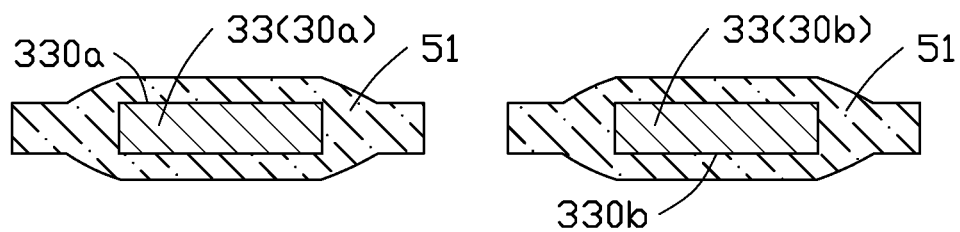
FIG. 3 is a cross-sectional view of an embodiment of packaging regions covered by packaging portions.

Referring to FIG. 3, an outer surface 330a of the packaging region 33 of the positive tab 30a and an outer surface 330b of the packaging region 33 of the negative tab 30b are respectively covered by one packaging portion 51. The packaging portion 51 covering the packaging region 33 of the positive tab 30a and the packaging portion 51 covering the packaging region 33 of the negative tab 30b are independent of each other.

Figure 4:
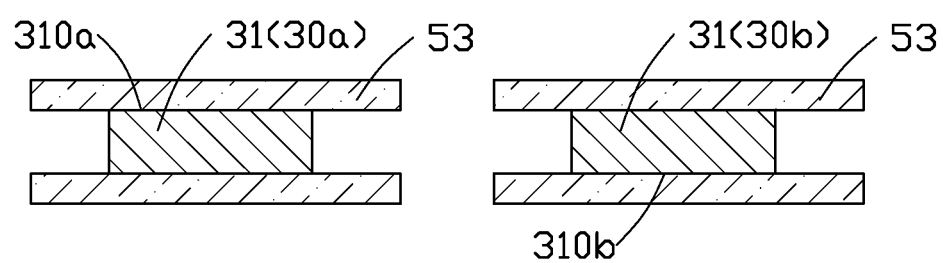
FIG. 4 is a cross-sectional view of an embodiment of connecting regions covered by protective portions.

Referring to FIG. 4, an outer surface 310a of the connecting region 31 of the positive tab 30a and an outer surface 310b of the connecting region 31 of the negative tab 30b are respectively covered by one protective portion 53. The protective portion 53 covering the connecting region 31 of the positive tab 30a and the protective portion 53 covering the connecting region 31 of the negative tab 30b are independent of each other.

In at least one embodiment, a thickness of the packaging portion 51 is about 5 μm to about 200 μm, and a thickness of the protective portion 53 is about 5 μm to about 200 μm.

Figure 5:
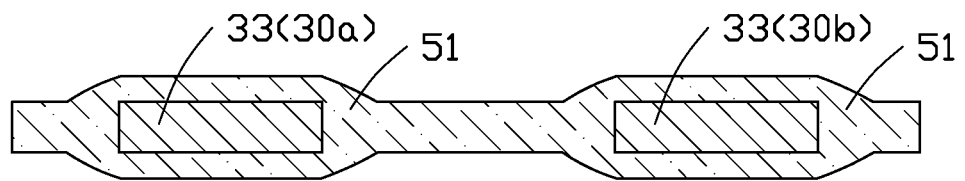
FIG. 5 is a cross-sectional view of another embodiment of packaging regions covered by packaging portions.

In a second embodiment, referring to FIG. 5, different from the first embodiment in that the packaging portion 51 covering the packaging region 33 of the positive tab 30a is integrally connected to the packaging portion 51 covering the packaging region 33 of the negative tab 30b.

Figure 6:
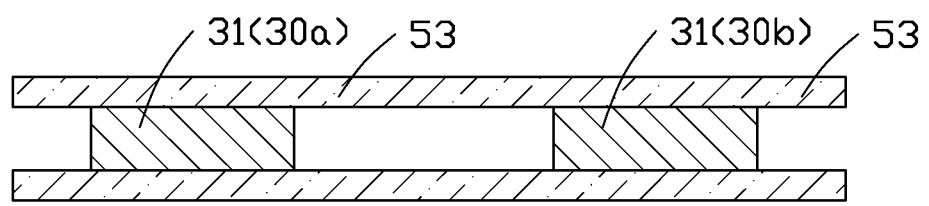
FIG. 6 is a cross-sectional view of another embodiment of connecting regions covered by protective portions.

In a third embodiment, referring to FIGS. 5 and 6, different from the first embodiment in that the packaging portion 51 covering the packaging region 33 of the positive tab 30a is integrally connected to the packaging portion 51 covering the packaging region 33 of the negative tab 30b. The protective portion 53 covering the connecting region 31 of the positive tab 30a is integrally connected to the protective portion 53 covering the connecting region 31 of the negative tab 30b.

Figure 7:
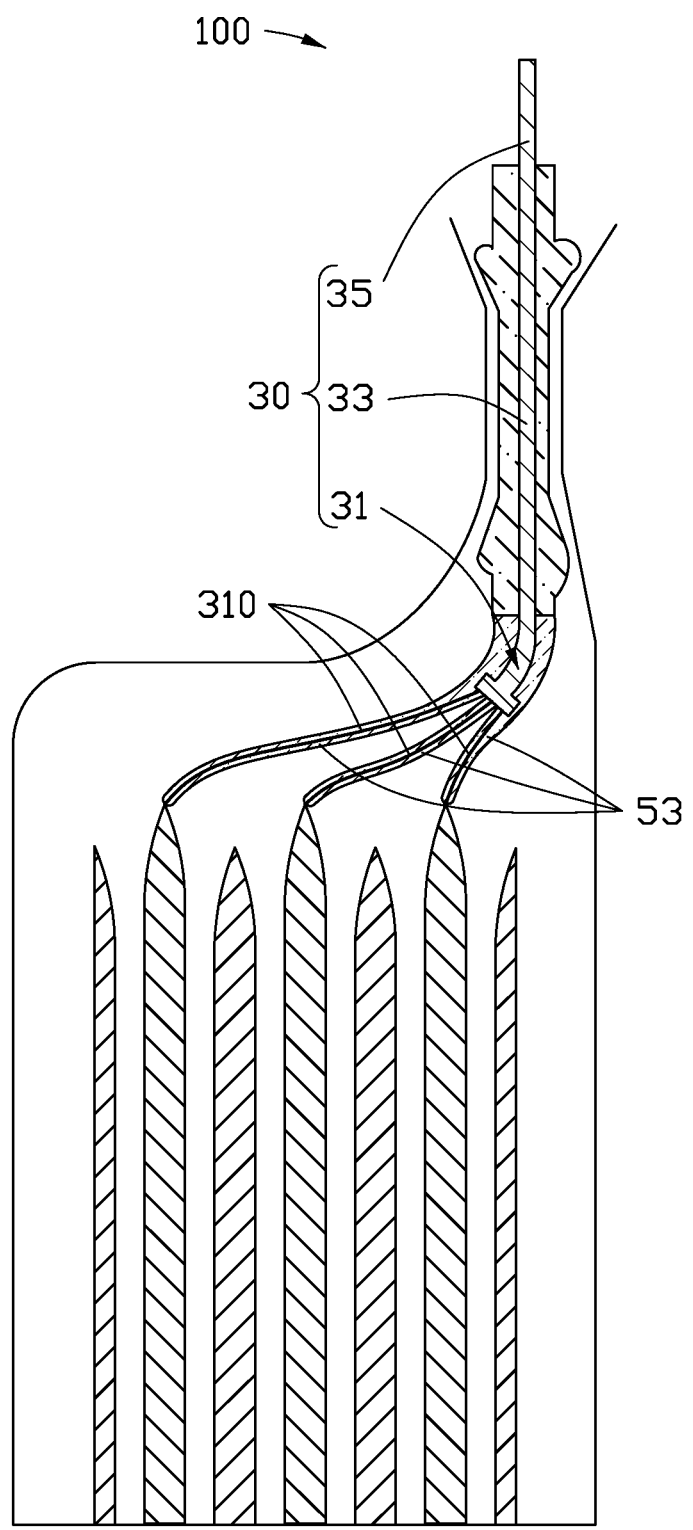
FIG. 7 is a cross-sectional view of a fourth embodiment of part of a battery.

In a fourth embodiment, referring to FIG. 7, different from the first embodiment in that the connecting region 31 of each tab 30 includes a plurality of sub-tabs 310, and each insulating layer 50 includes a packaging portion 51 and a plurality of the protective portions 53 connecting to the packaging portion 51. Each sub-tab 310 is covered by one of the plurality of the protective portions 53, and the plurality of the protective portions 53 are independent of each other.

Figure 8:
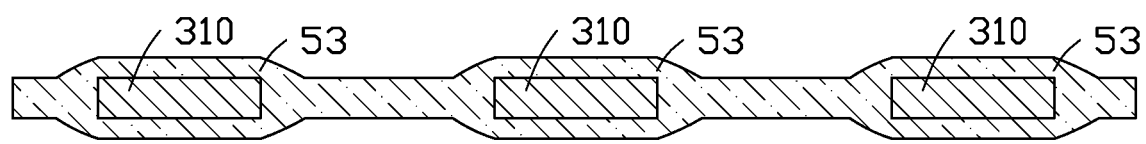
FIG. 8 is a cross-sectional view of another embodiment of sub-tabs covered by protective portions.

In a fifth embodiment, referring to FIG. 8, different from the fourth embodiment in that the plurality of the protective portions 53 covering the sub-tabs 310 in a same tab 30 are integrally connected to each other.

Figure 9:
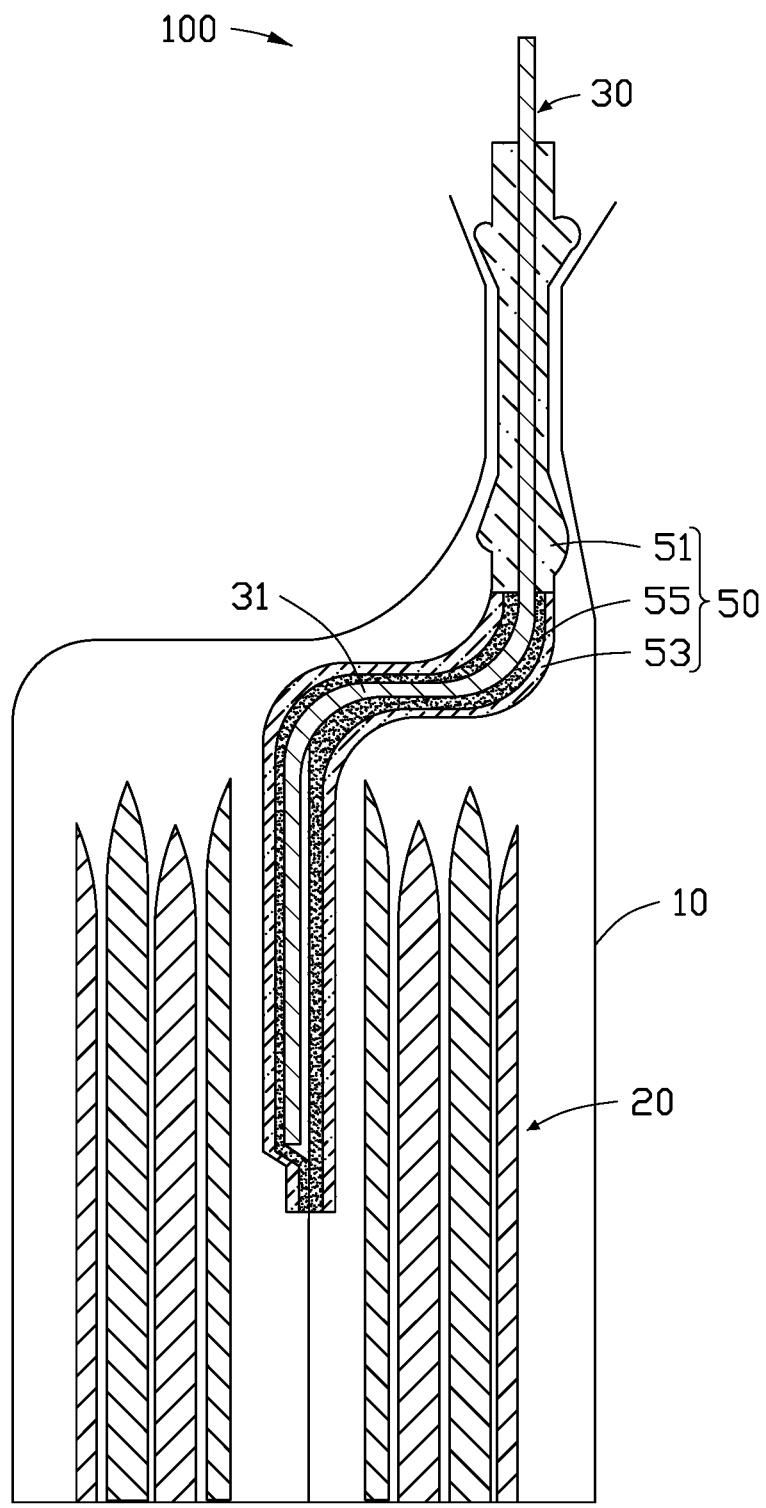
FIG. 9 is a cross-sectional view of a sixth embodiment of part of a battery.

In a sixth embodiment, referring to FIG. 9, different from the first embodiment in that each insulating layer 50 further includes an adhesive portion 55, and the adhesive portion 55 is located between the connecting region 31 and the protective portion 53 to bond the connecting region 31 with the protective portion 53. Displacement is reduced between the tabs 30, the electrode assembly 20, and the packaging film 10 when the battery 100 is impacted. Therefore, the effect of impact of the tabs 30 and the electrode assembly 20 on the top of the packaging film 10 is further reduced, thereby improving the safety and reliability of the battery 100.

In at least one embodiment, a thickness of the adhesive portion 55 is about 5 μm to about 200 μm.

Figure 10:
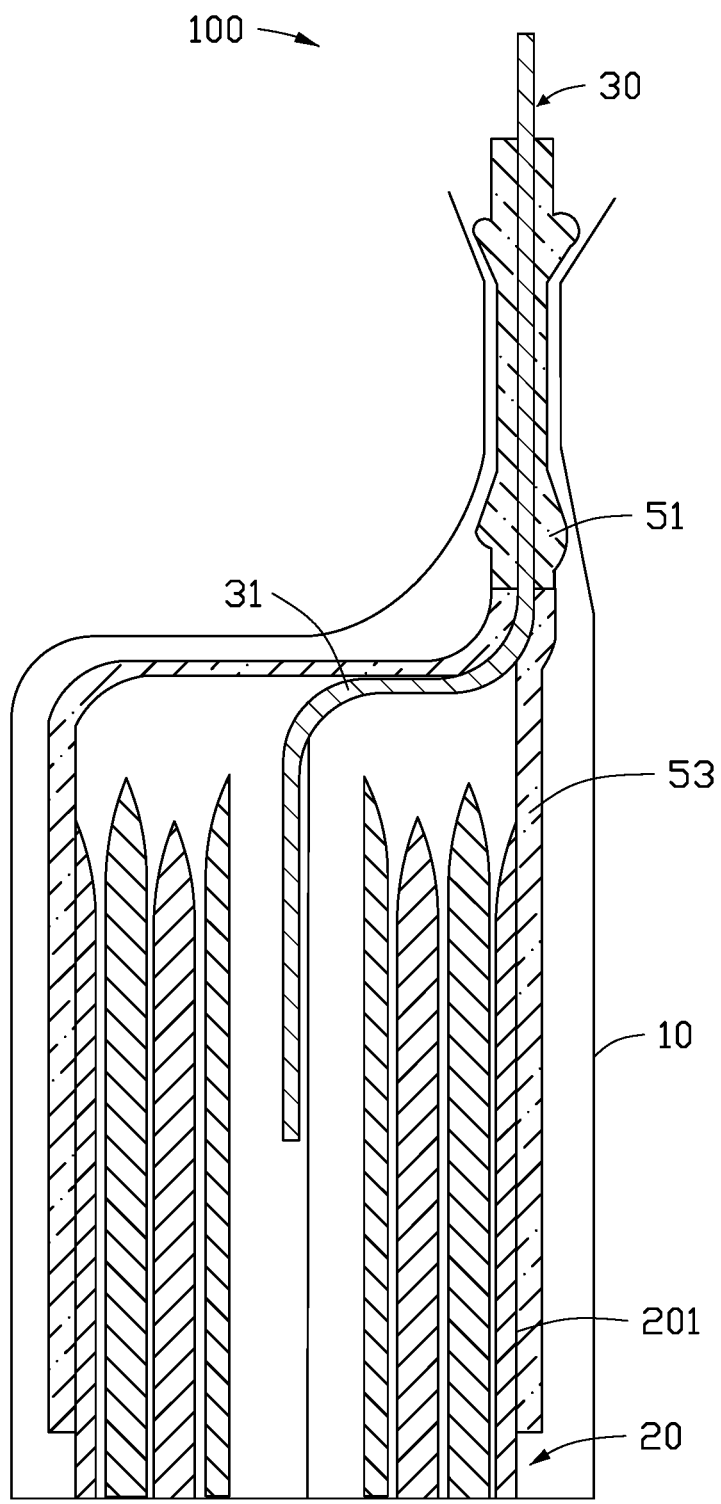
FIG. 10 is a cross-sectional view of a seventh embodiment of part of a battery.

In a seventh embodiment, referring to FIG. 10, an end of the protective portion 53 facing away from the packaging portion 51 is located on an outer surface 201 of the electrode assembly 20. The protective portion 53 is located between the electrode assembly 20 and the top of the packaging film 10, and located between the connecting region 31 and the top of the packaging film 10.

The protective portion 53 acts as a buffer against impact to the electrode assembly 20 and the connecting region 31 on the top of the packaging film 10 when the battery 100 is impacted, the electrode assembly 20 and the connecting region 31 are not able to pierce the top of the packaging film 10.

Figure 15:
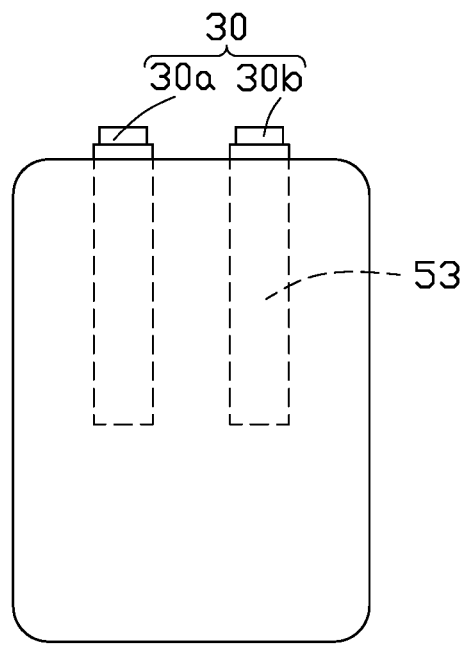
FIG. 15 is a diagram of an embodiment of a battery.
Figure 16:
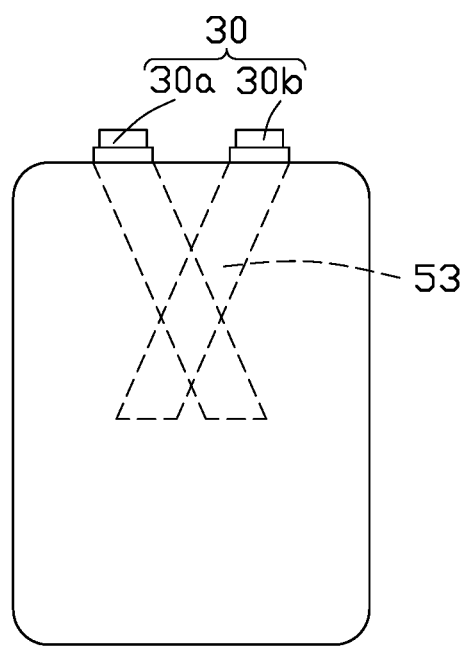
FIG. 16 is a diagram of an embodiment of a battery.
Figure 17:
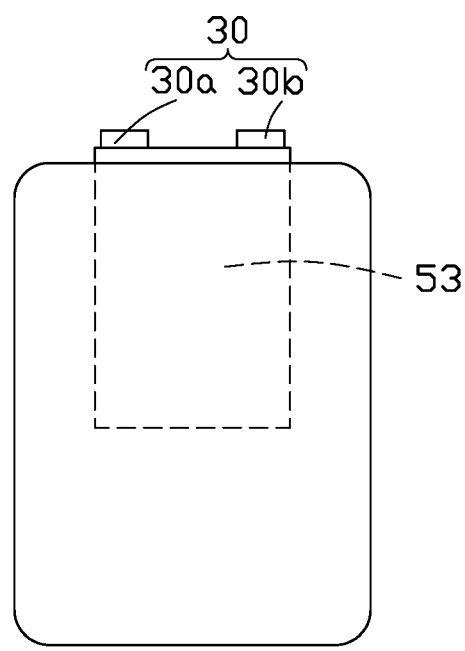
FIG. 17 is a cross-sectional view of a seventh embodiment of part of a battery.

In at least one embodiment, referring to FIGS. 10 and 15, the number of the tabs 30 is two, being a positive tab 30*a* and a negative tab 30*b*. The protective portion 53 corresponding to the positive tab 30*a* and the protective portion 53 corresponding to the negative tab 30*b* are independent of each other. In at least one embodiment, the protective portion 53 corresponding to the positive tab 30*a* and the protective portion 53 are disposed in parallel with each other on the outer surface 201 of the electrode assembly 20. In at least one embodiment, referring to FIG. 16, the protective portion 53 corresponding to the positive tab 30*a* and the protective portion 53 may intersect on the outer surface 201 of the electrode assembly 20. In at least one embodiment, referring to FIG. 17, the protective portion 53 corresponding to the positive tab 30*a* may be integrally connected to the protective portion 53.

Figure 11:
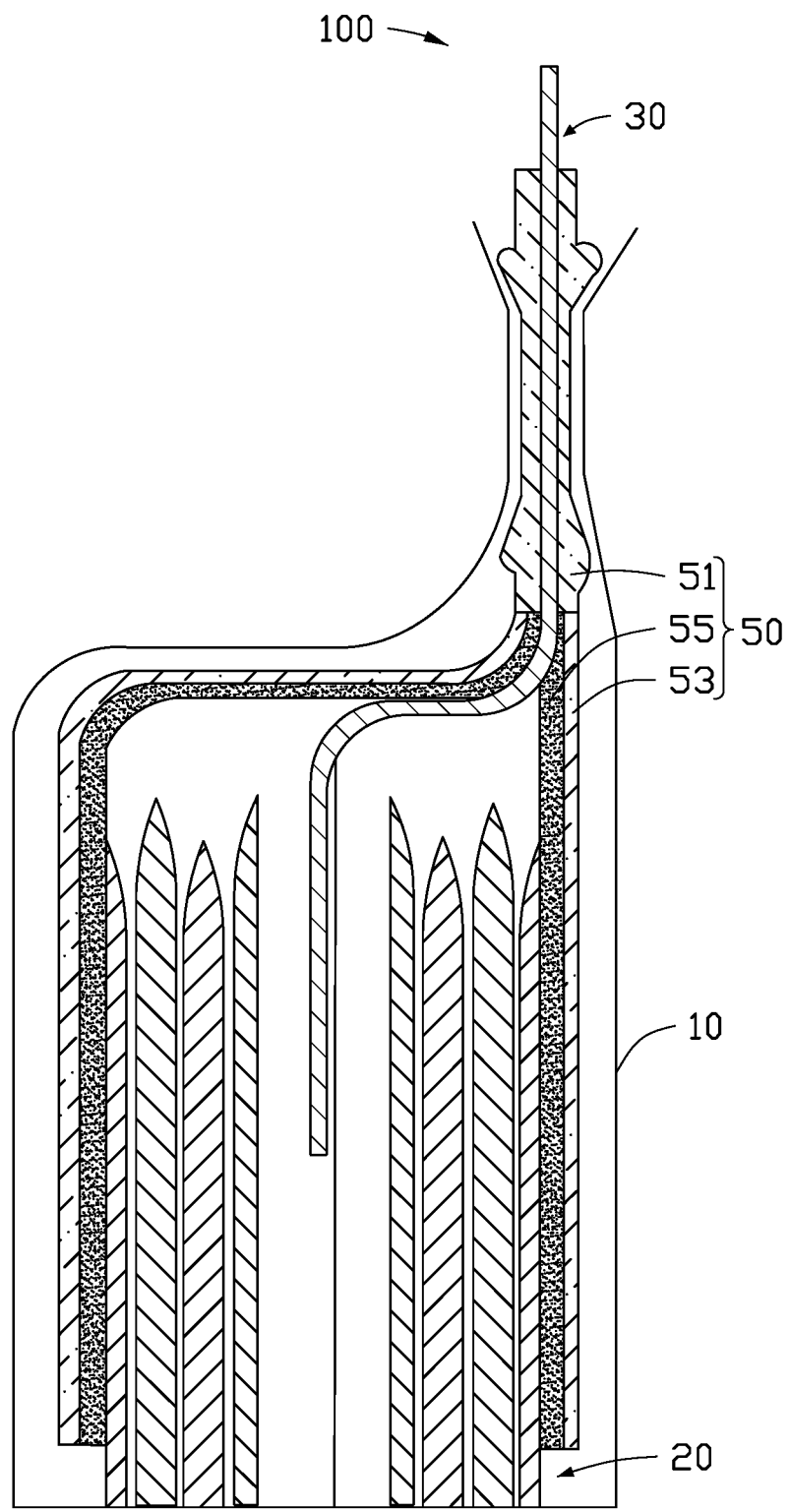
FIG. 11 is a cross-sectional view of an eighth embodiment of part of a battery.

In an eighth embodiment, referring to FIG. 11, different the seventh embodiment in that each insulating layer 50 further includes an adhesive portion 55, and the adhesive portion 55 is located between the electrode assembly 20 and the protective portion 53 to bond the electrode assembly 20 with the protective portion 53. Displacement between the tabs 30, the electrode assembly 20, and the packaging film 10 is thus reduced when the battery 100 is impacted. Therefore, impact of the tabs 30 and the electrode assembly 20 on the top of the packaging film 10 is further reduced, thereby improving the safety and reliability of the battery 100.

In at least one embodiment, the adhesive portion 55 is formed on the whole surface of the protective portion 53 facing the electrode assembly 20. In at least one embodiment, the adhesive portion 55 may be formed on a partial region of the surface of the protective portion 53 facing the electrode assembly 20, such that the adhesive portion 55 bonding the electrode assembly 20 with the protective portion 53 is sufficient.

Figure 12:
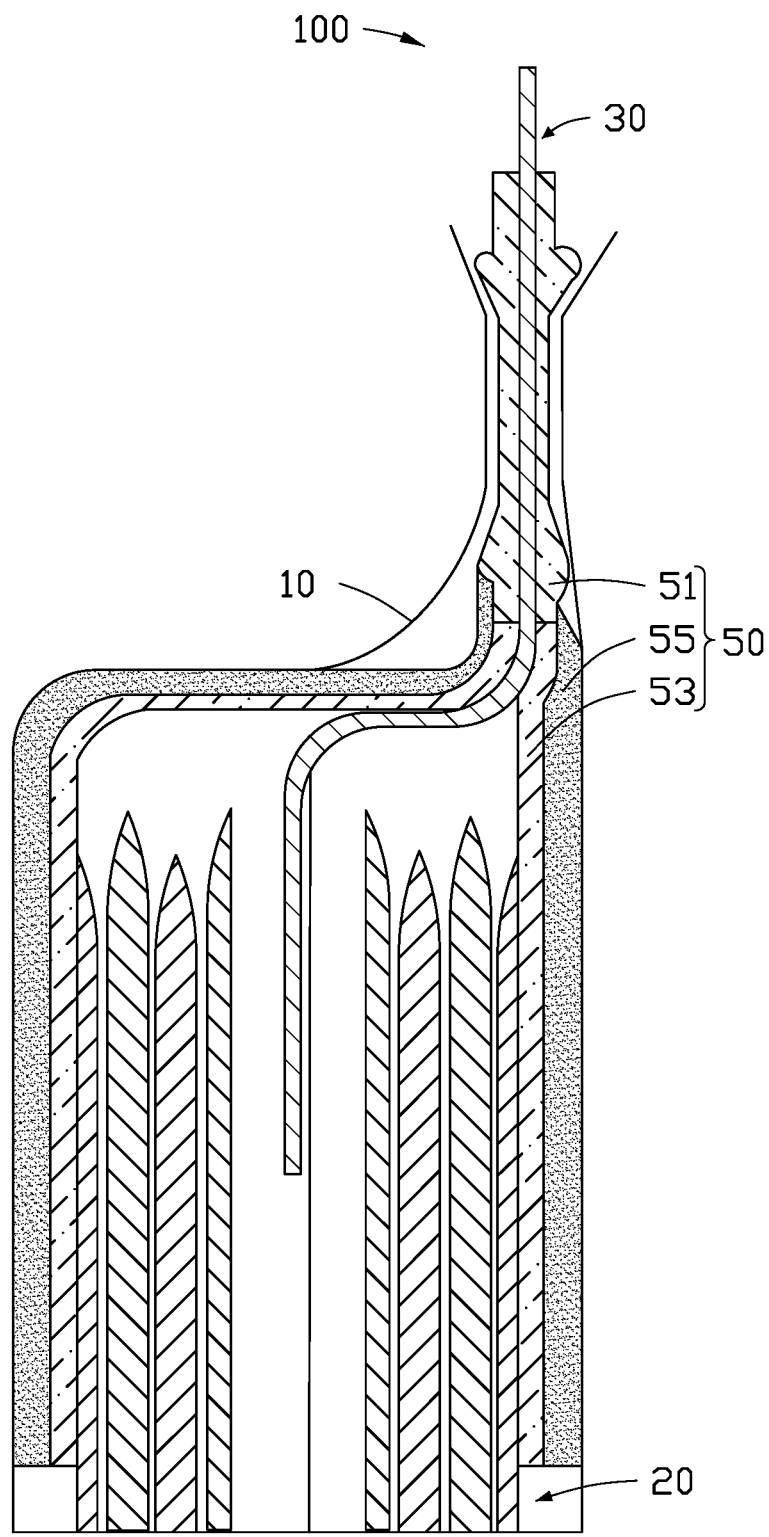
FIG. 12 is a cross-sectional view of a ninth embodiment of part of a battery.

In a ninth embodiment, referring to FIG. 12, different from the seventh embodiment in that each insulating layer 50 further includes an adhesive portion 55, and the adhesive portion 55 is located between the packaging film 10 and the protective portion 53 to bond the packaging film 10 with the protective portion 53.

In at least one embodiment, the adhesive portion 55 is formed on the whole surface of the protective portion 53 facing away from the electrode assembly 20. In at least one embodiment, the adhesive portion 55 may be formed on a partial region of the surface of the protective portion 53 facing away from the electrode assembly 20, such that the adhesive portion 55 bonding the packaging film 10 with the protective portion 53 is sufficient.

Figure 13:
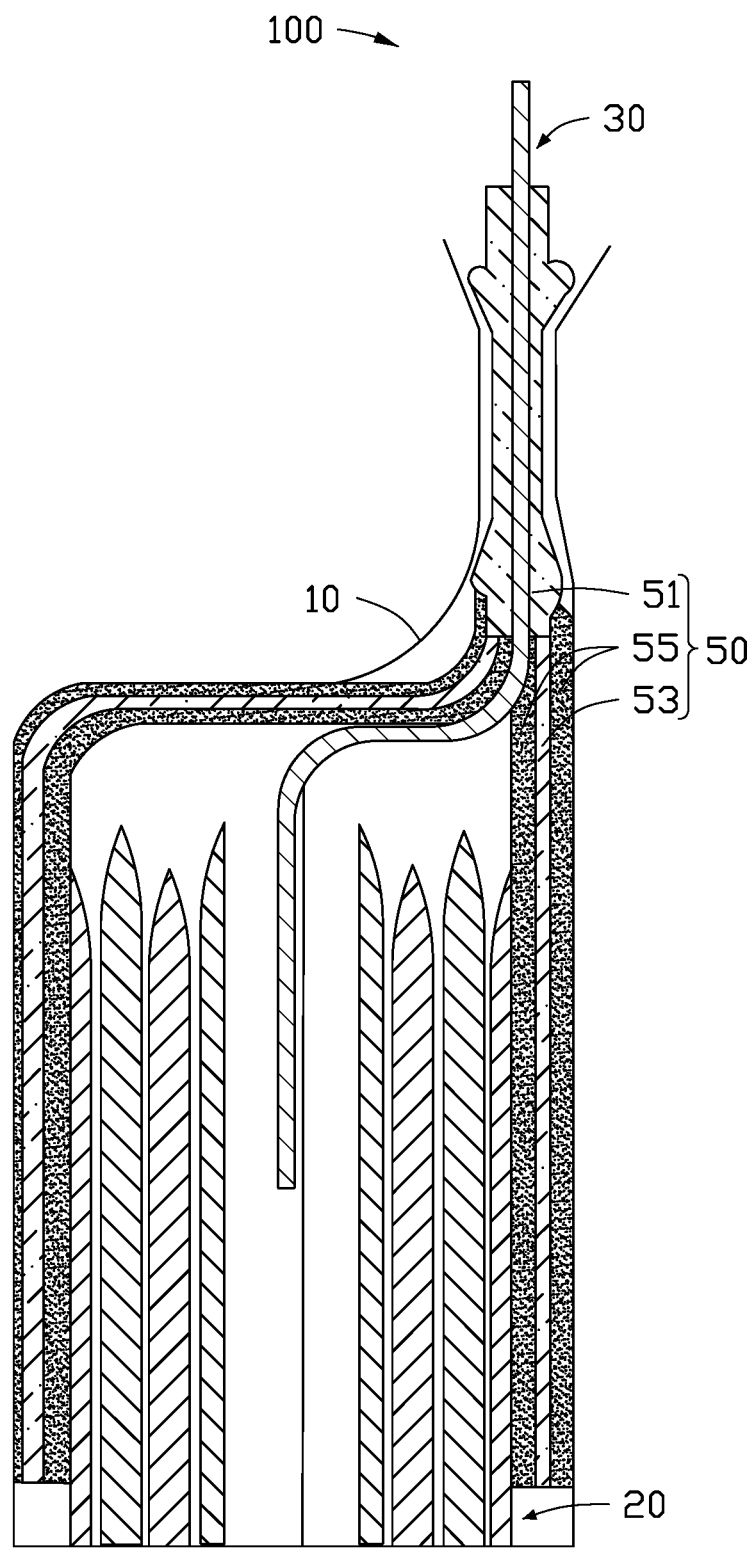
FIG. 13 is a cross-sectional view of a tenth embodiment of part of a battery.

In a tenth embodiment, referring to FIG. 13, different from the seventh embodiment in that each insulating layer 50 further includes an adhesive portion 55, and the adhesive portion 55 is located between the electrode assembly 20 and the protective portion 53 and located between the protective portion 53 and the packaging film 10 to bond the electrode assembly 20, the tabs 30 with the packaging film 10.

Figure 14:
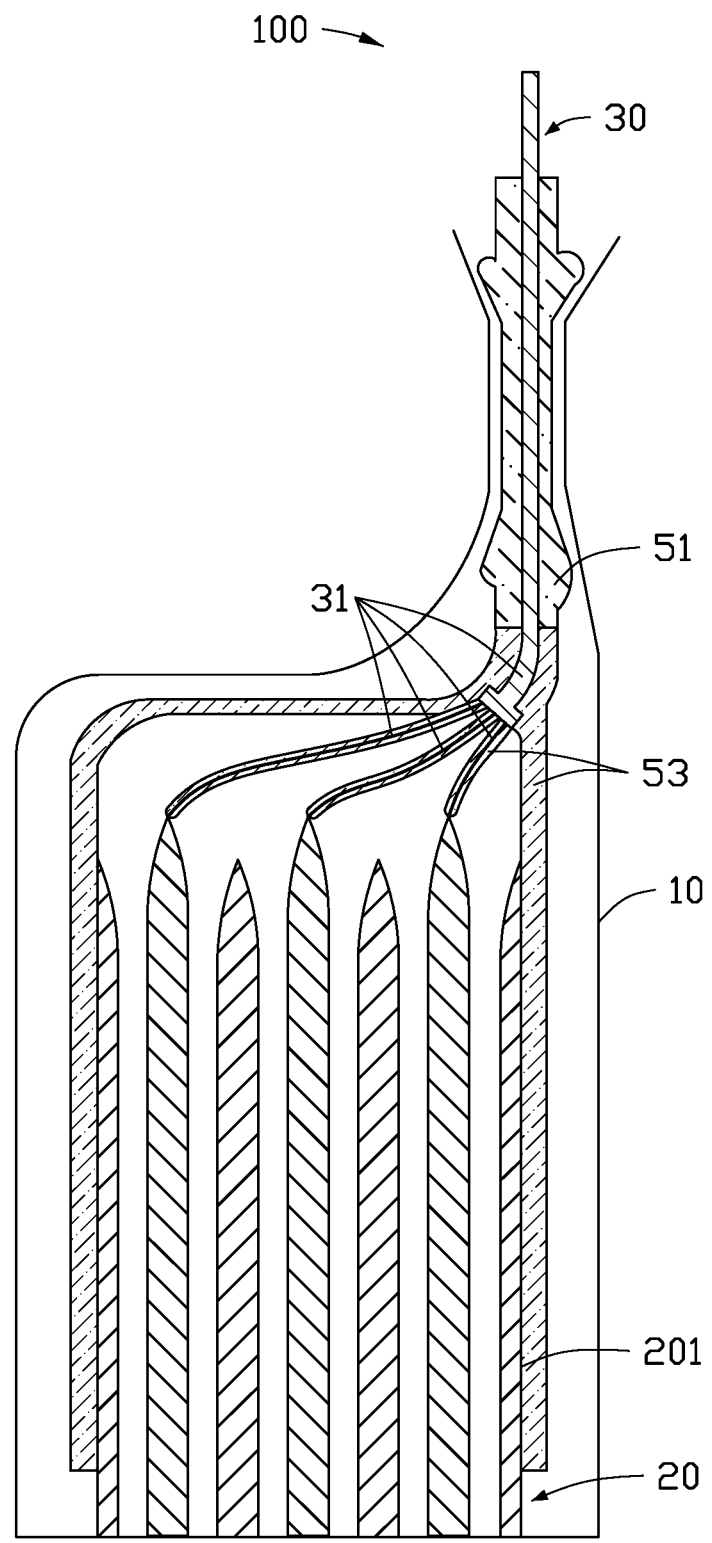
FIG. 14 is a cross-sectional view of an eleventh embodiment of part of a battery.

In an eleventh embodiment, referring to FIG. 14, different from the seventh embodiment in that the protective portion 53 is also disposed on an outer surface 310 of the connecting region 31. The protective portion 53 having one end on the outer surface 201 of the electrode assembly 20 buffers impacts against the electrode assembly 20 and the connecting region 31 on the top of the packaging film 10 when the battery 100 is impacted. The electrode assembly 20 and the connecting region 31 thus do not pierce the top of the packaging film 10. The protective portion 53 disposed on the outer surface 310 of the connecting region 31 prevents the connecting region 31 and the electrode assembly 20 from coming into contact and thus avoids a short circuit between the connecting region 31 and the electrode assembly 20.

In at least one embodiment, the connecting region 31 may include a plurality of sub-tabs.

Figure 18:
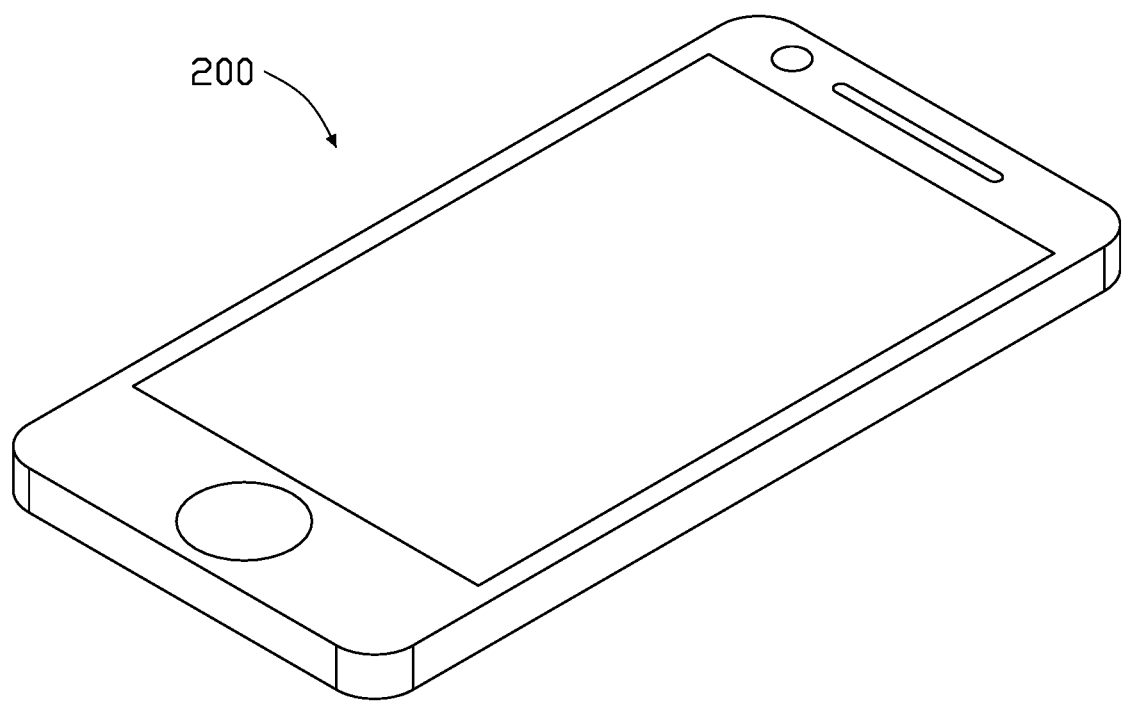
FIG. 18 is a diagram of an embodiment of a device containing a battery.

Referring to FIG. 18, the battery 100 can be used in many devices 200, such as electronic devices, mechanical devices, or automobiles. The electronic devices may be mobile phones, pads, computers, or cameras.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A battery comprising:
   a packaging film;
   an electrode assembly received in the packaging film;
   tabs extending from an end portion of the electrode assembly; and
   insulating layers;
   wherein each of the tabs comprises a connecting region, a packaging region and an exposed region connected in the order written along a longitudinal direction of the tab; the connecting region is electrically connected to the electrode assembly, and the exposed region is exposed from the packaging film; each of the insulating layers comprises a packaging portion and a protective portion connecting to the packaging portion along the longitudinal direction of the tab; the packaging portion covers the packaging region and is located between the packaging film and the packaging region; and the protective portion covers the connecting region and is located between the connecting region and the packaging film, and a surface area of the protective portion is greater than a surface area of the connecting region, wherein the surface area of the protective portion is an area of a surface of the protective portion in contact with the connecting region and the surface area of the connecting region is an area of a surface of the connecting region in contact with the protective portion.

2. The battery of claim 1, wherein the protective portion is located on an outer surface of the connecting region.

3. The battery of claim 2, wherein the connecting region comprises a plurality of sub-tabs, each of the insulating layers comprises a plurality of the protective portions, each of the plurality of sub-tabs is covered by one of the plurality of the protective portions, and the plurality of the protective portions are independent of each other or integrally connected to each other.

4. The battery of claim 1, wherein the tabs are at least one positive tab and at least one negative tab; the packaging region of each of the at least one positive tab and the packaging region of each of the at least one negative tab are respectively covered by the packaging portion; the packaging portion covering each of the at least one positive tab and the packaging portion covering each of the at least one negative tab are independent of each other or integrally connected to each other; the protective portion corresponding to each of the at least one positive tab and the protective portion corresponding to each of the at least one negative tab are independent of each other or integrally connected to each other.

5. The battery of claim 1, wherein each of the insulating layers further comprises an adhesive portion, the adhesive portion bonds the connecting region with the protective portion.

6. The battery of claim 1, wherein an end of the protective portion facing away from the packaging portion is located on an outer surface of the electrode assembly.

7. The battery of claim 6, wherein each of the insulating layers further comprises an adhesive portion, the adhesive portion bonds the protective portion to the electrode assembly.

8. The battery of claim 6, wherein each of the insulating layers further comprises an adhesive portion, the adhesive portion bonds the protective portion with the packaging film.

9. The battery of claim 1, wherein the protective portion is located on an outer surface of the connecting region.

10. The battery of claim 1, wherein a thickness of the packaging portion is 5 µm to 200 µm, and a thickness of the protective portion is 5 µm to 200 µm.

11. A device comprising:
a battery comprising:
a packaging film;
an electrode assembly received in the packaging film;
tabs extending from an end portion of the electrode assembly; and
insulating layers;
wherein each of the tabs comprises a connecting region, a packaging region and an exposed region connected in the order written along a longitudinal direction of the tab; the connecting region is electrically connected to the electrode assembly, and the exposed region is exposed from the packaging film; each of the insulating layers comprises a packaging portion and a protective portion connecting to the packaging portion along the longitudinal direction of the tab; the packaging portion covers the packaging region and is located between the packaging film and the packaging region; and the protective portion covers the connecting region and is located between the connecting region and the packaging film, and a surface area of the protective portion is greater than a surface area of the connecting region, wherein the surface area of the protective portion is an area of a surface of the protective portion in contact with the connecting region and the surface area of the connecting region is an area of a surface of the connecting region in contact with the protective portion.

12. The device of claim 11, wherein the protective portion is located on an outer surface of the connecting region.

13. The device of claim 12, wherein the connecting region comprises a plurality of sub-tabs, each of the insulating layers comprises a plurality of the protective portions, each of the plurality of sub-tabs is covered by one of the plurality of the protective portions, and the plurality of the protective portions are independent of each other or integrally connected to each other.

14. The device of claim 11, wherein the tabs are at least one positive tab and at least one negative tab; the packaging region of each of the at least one positive tab and the packaging region of each of the at least one negative tab are respectively covered by the packaging portion; the packaging portion covering each of the at least one positive tab and the packaging portion covering each of the at least one negative tab are independent of each other or integrally connected to each other; the protective portion corresponding to each of the at least one positive tab and the protective portion corresponding to each of the at least one negative tab are independent of each other or integrally connected to each other.

15. The device of claim 11, wherein each of the insulating layers further comprises an adhesive portion, the adhesive portion bonds the connecting region with the protective portion.

16. The device of claim 11, wherein an end of the protective portion facing away from the packaging portion is located on an outer surface of the electrode assembly.

17. The device of claim 16, wherein each of the insulating layers further comprises an adhesive portion, the adhesive portion bonds the protective portion to the electrode assembly.

18. The device of claim 16, wherein each of the insulating layers further comprises an adhesive portion, the adhesive portion bonds the protective portion with the packaging film.

19. The device of claim 11, wherein the protective portion is located on an outer surface of the connecting region.

20. The device of claim 10, wherein a thickness of the packaging portion is 5 µm to 200 µm, and a thickness of the protective portion is 5 µm to about 200 µm.

* * * * *